(12) United States Patent  (10) Patent No.: US 7,643,704 B2
Jackson et al.  (45) Date of Patent: Jan. 5, 2010

(54) CROPPING A DIGITAL IMAGE AND PRESERVING RESERVES

(75) Inventors: William M. Jackson, Victor, NY (US); Kenneth A. Parulski, Rochester, NY (US); James E. McGarvey, Hamlin, NY (US)

(73) Assignee: Eastman Kodak Company, Rochester, NY (US)

( * ) Notice: Subject to any disclaimer, the term of this patent is extended or adjusted under 35 U.S.C. 154(b) by 599 days.

(21) Appl. No.: 11/051,193

(22) Filed: Feb. 4, 2005

(65) Prior Publication Data

US 2006/0177132 A1  Aug. 10, 2006

(51) Int. Cl.
 *G06K 9/32*  (2006.01)
(52) U.S. Cl. .................. 382/298; 382/266; 382/275; 382/293
(58) Field of Classification Search .............. 382/266, 382/269, 282, 298
 See application file for complete search history.

(56) References Cited

U.S. PATENT DOCUMENTS 5,327,235 A * 7/1994 Richards .................. 348/441
5,675,400 A * 10/1997 Stephenson, III ............ 355/40
5,973,734 A * 10/1999 Anderson ................... 348/239
6,016,362 A * 1/2000 Kato et al. .................. 382/232
6,049,371 A * 4/2000 Manico et al. ............... 355/41
6,356,283 B1 * 3/2002 Guedalia .................... 715/760
6,535,645 B2 * 3/2003 Bright et al. ................ 382/248
7,162,102 B2 * 1/2007 Cahill et al. ................ 382/288
7,171,058 B2 * 1/2007 Luo .......................... 382/298

OTHER PUBLICATIONS

"Information technology—digital compression and coding of continuous-tone still images: Requirements and guidelines", ISO/IEC 10918-1, First edition, Feb. 15, 1994.
"Digital Still Camera Image File Format Standard (exchangeable image file format for digital still cameras: Exif)", version 2.0, Japan Electronic Industry Development Association, Oct. 31, 1997.
TIFF, Revision 6.0, Final - Jun. 3, 1992.
JPEG File Interchange Format, Version 1.02, Sep. 1, 1992.

* cited by examiner

*Primary Examiner*—Yosef Kassa
(74) *Attorney, Agent, or Firm*—Raymond L. Owens; Kathleen Neuner Manne; Eugene I. Shkurko (57) ABSTRACT

A method of cropping a digital image and preserving a reserve for subsequent use includes cropping the digital image to produce a first cropped digital image, the first cropped digital image having a first size and a first aspect ratio; determining, based on the location of the cropping, at least one reserve portion of the image adjacent to at least one edge of the first cropped digital image; and storing, in an image file, the first cropped digital image and the reserve(s).

24 Claims, 8 Drawing Sheets

CROPPING A DIGITAL IMAGE AND PRESERVING RESERVES

FIELD OF THE INVENTION

The present invention relates to methods of digital image processing and, in particular, to a method of preserving image data when cropping an image.

BACKGROUND OF THE INVENTION

One of the many benefits of using digital images is the ease with which the images can be used for different purposes. Images captured with a digital camera are immediately available to view, print and share with others by email or web page. Photographers enjoy the ability to easily manipulate their images to improve their quality and artistic expression. Image manipulation can be performed manually, under the user's control, or automatically, using a variety of algorithms to evaluate and modify an image to improve its quality in some way. Manipulations can be performed in a digital camera, at the time of capture or during later review, using a personal computer with image editing software, using editing tools on a web site.

Cropping is one of the most common manipulations. Cropping an image means to select a desired region of the image and create a new image consisting only of the desired region, discarding the surrounding region. Cropping is normally done to improve the composition of the image, enlarging or repositioning the main subject and discarding distracting subject elements or uninteresting background areas. Cropping is also necessary when the aspect ratio of the original image does not match the aspect ratio of a desired print, display or other output format.

Aspect ratio refers to the ratio of the longer dimension of an image or print to the shorter dimension. Table 1 lists several common print and display formats and their aspect ratios.

TABLE 1

| | | |
|---|---|---|
| 2 × 3 inch print (wallet size) | 3:2 | 1.5 |
| 3.5 × 5 inch print (3R) | 10:7 | 1.43 |
| 4 × 6 inch print (4R) | 3:2 | 1.5 |
| 5 × 7 inch print | 7:5 | 1.4 |
| 8 × 10 inch print | 5:4 | 1.25 |
| 16 × 20 inch print | 5:4 | 1.25 |
| 20 × 30 inch print (poster) | 3:2 | 1.5 |
| NTSC television | 4:3 | 1.33 |
| HDTV television | 16:9 | 1.78 |
| VGA (640 × 480) | 4:3 | 1.33 |

It is common in the industry to refer to aspect ratios using two numbers (as 3:2). The table also shows the normalized ratio (as 1.5) for each example, so that it is easier to compare ratios. The larger the aspect ratio is numerically, the "longer" or "narrower" the image is said to be. Images can be presented in vertical (portrait) or horizontal (landscape) orientations. Aspect ratio is properly the ratio of the width of the image to the height. This usage is consistent in the fields of video and computer displays, but in the photographic industry, it is common to ignore orientation when stating aspect ratio. Thus, a 4×6 print is described as having an aspect ratio of 3:2 whether it is horizontally or vertically displayed. For clarity, in the following description, aspect ratios will always be stated in the form width:height. For example, a portrait orientation crop for a 4×6 print size will be stated as a 2:3 crop.

Figure 1A:
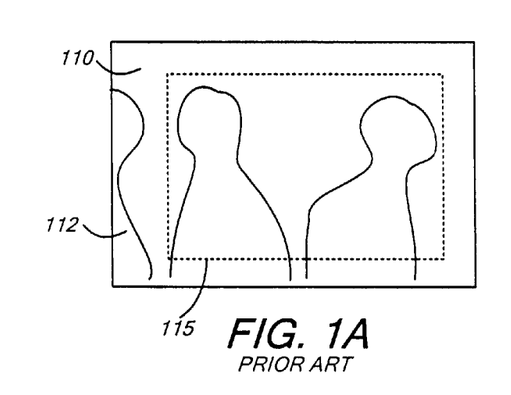
FIGS. 1A, 1B, 1C and 1D illustrate the prior art problem of cropping and then re-cropping to a different aspect ratio.
Figure 1B:
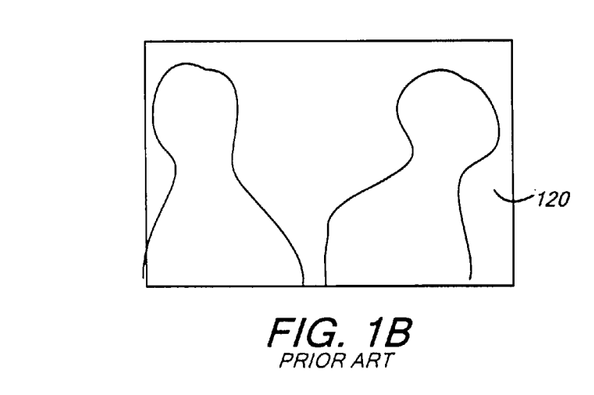
Figure 1C:
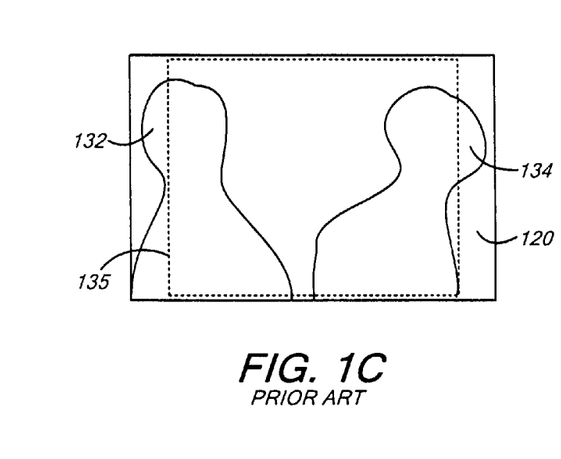
Figure 1D:
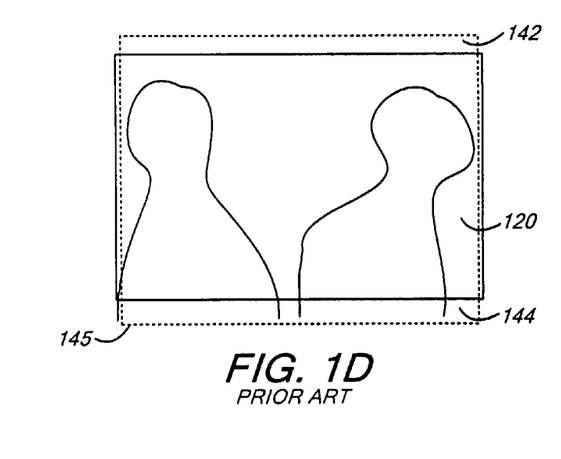

A problem arises when re-cropping an image for a different aspect ratio. This problem is illustrated in FIGS. 1A through 1C. In FIG. 1A, an original image 110 of two children is captured by a user with a digital camera having a 3:2 aspect ratio. After capture, the user wishes to make a 4×6 print of the original image 110. The user crops the original image 110 using an image editing program on a personal computer so that the images of the children mostly fill a cropped image area 115, unwanted subject matter 112 is excluded, and the aspect ratio is 3:2 in order to fill the 4×6 print paper. The user saves the cropped image 120 in place of the original image 110. Later, the user wishes to make an 8×10 print of image 120 and frame it for a gift. Since the aspect ratio of the 8×10 print is different from the aspect ratio of the original 3:2 crop, the user must choose how to reformat image 120 for the 5:4 aspect ratio of the print. A crop area 135 smaller than image 120 will cut off portions 132 and 134 of the images of the children's faces. A crop area 145 larger than image 120 will result in a print with blank spaces 142 and 144 above and below the image area. Both choices have problems that result in an unsatisfactory framed image.

The problem set forth above has been addressed in some instances by keeping the original image data intact and recording the position and size of the crop rectangle in the metadata of the image file. This approach was used in the FlashPix image format, which was specified in the "FlashPix Format Specification, version 1.0, published in September 1996 by Eastman Kodak Company. The FlashPix format included an optional "transform property set" which defined how the image data should be transformed before being displayed or printed. The transform property set includes an optional "rectangle of interest" property and an optional "result aspect ratio" property. These properties can be used to provide data that specifies how an image should be cropped before display or printing. The "rectangle of interest" property includes four data values which define the left edge, top edge, width, and height of the rectangle of interest within the image. The digital image in a FlashPix image file can be cropped to this rectangle of interest before being displayed or printed. The "result aspect ratio" property is a number that can be used to define a rectangle of a specific aspect ratio. Pixels outside this rectangle are cropped by FlashPix applications which read the file and display or print the image. As a result, when a FlashPix format image is edited, cropping can be performed by changing the "rectangle of interest" property, without modifying any of the image data in the file. Unfortunately, such FlashPix files can only be opened by a limited selection of software applications. Furthermore, the image file is large, even if significant cropped is performed, because it contains all of the data in the original. Furthermore, some FlashPix applications ignored the transform property set, because it was optional, and therefore displayed the uncropped, original image.

It is also possible to store crop information in an industry standard file format, such as the JPEG format. In this case, the image can be opened by many applications, but most will ignore the crop information and display the original, uncropped image.

SUMMARY OF THE INVENTION

It is an object of the present invention to crop a digital image and permit it to be used effectively to produce a second cropped digital image.

This object is achieved by a method of cropping a digital image and preserving a reserve for subsequent use comprising:

a) cropping the digital image to produce a first cropped digital image, the first cropped digital image having a first size and a first aspect ratio.

b) determining, based on the location of the cropping, at least one reserve portion of the image adjacent to at least one edge of the first cropped digital image; and c) storing, in an image file, the first cropped digital image and the reserve(s).

By storing one or more reserves and a cropped first digital image in an image file, a user can effectively produce a second cropped digital image having a second size, for example a second aspect ratio.

DETAILED DESCRIPTION OF THE INVENTION

The present invention overcomes the problem set forth above by creating a standard format cropped image file, which still contains some or all of the image data that was not included in the cropped area. This reserve data is normally not visible to the user when displaying the cropped image with standard display devices and software, but can be recovered when it is desired to change the aspect ratio or crop area of the image. The method described here can be embodied in any device or software that crops an image, whether manually or automatically.

Figure 2A:
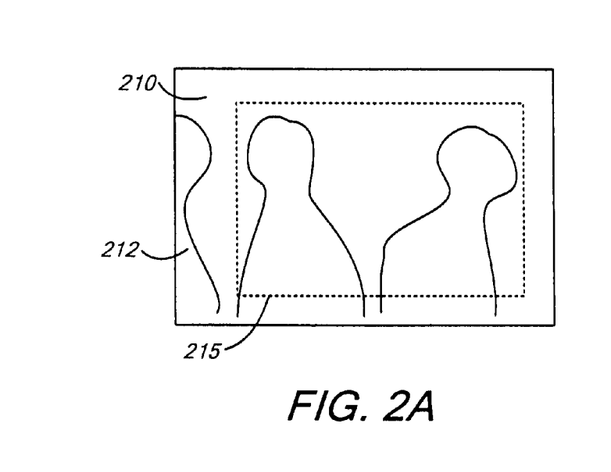
FIGS. 2A, 2B, and 2C illustrate the use of the invention to preserve top and bottom portions of the cropped image data to permit re-crop at a different aspect ration.
Figure 2B:
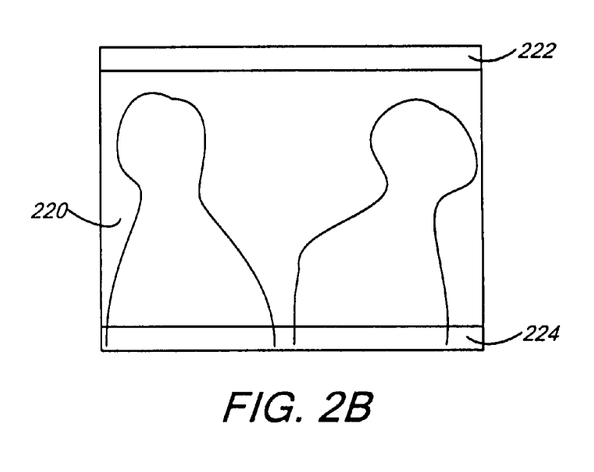
Figure 2C:
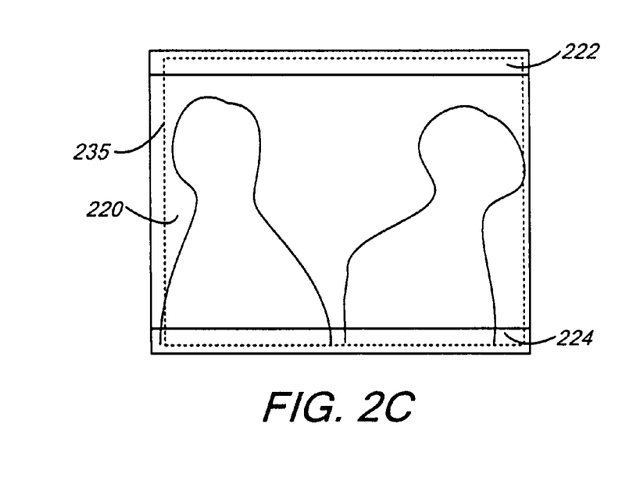

FIGS. 2A, 2B and 2C illustrate a first example of the use of the present invention. In FIG. 2A, an original image 210 of two children is marked with a user selected crop rectangle 215. This crop rectangle 215 is selected by the user to fill the frame with the images of the children, excluding unwanted surrounding subjects 212. In this example, original image 210 and crop rectangle 215 are both of 3:2 aspect ratio. The original image 210 aspect ratio is a function of the digital camera used to capture the image. The crop rectangle 215 is selected to produce a 4×6 inch print, so its aspect ratio is also 3:2.

FIG. 2B shows the resulting cropped image 220 and additional top and bottom image area reserves 222 and 224, respectively, that will be stored in the image file apart from the cropped image 220. When the cropped image 220 is viewed after this first crop, only portion 220 is displayed. Reserves 222 and 224 are effectively hidden from the user, but remain in the image file for later use.

FIG. 2C shows an example of later re-cropping. In this case, a second crop area 235 with an aspect ratio of 5:4 is selected, perhaps to make an 8×10 print. In order to keep the full image of each child's face in the print, the second crop area 235 requires the use of reserves 222 and 224. These reserves 222 and 224 are recovered from their hidden location and appended to the displayed image data when the user chooses to re-crop the image.

FIGS. 3A, 3B, 3C and 3D illustrate a second example of the use of the invention. Beginning with the original image 310 of two children, the user chooses a square crop 315 of one of the children, perhaps to send as an email attachment.

Figure 3A:
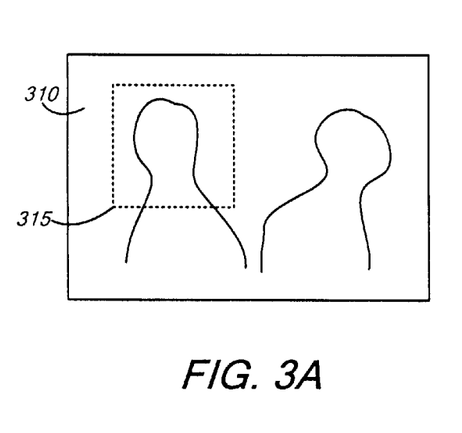
FIGS. 3A, 3B, 3C and 3D illustrate the use of the invention to preserve top and bottom and left and right portions of the cropped image data to permit re-crop at two different aspect ratios.
Figure 3B:
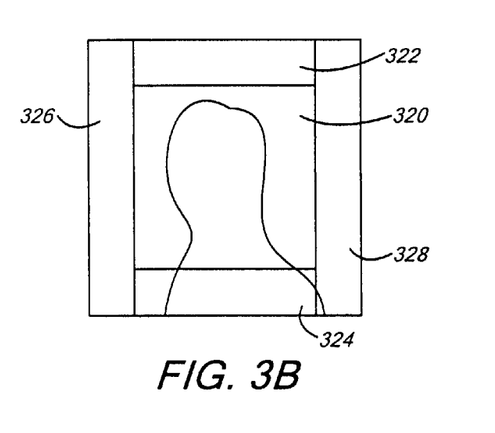

FIG. 3B shows the cropped image 320, this time with four additional image reserves 322, 324, 326 and 328 (top, bottom, left and right, respectively.) Top reserve 322 is adjacent to the top horizontal edge of the cropped image 320. Bottom reserve 324 is adjacent to the bottom horizontal edge of the cropped image 320. Left reserve 326 is adjacent to the left vertical edge of the cropped image 320. Right reserve 328 is adjacent to the right vertical edge of the cropped image 320.

Figure 3C:
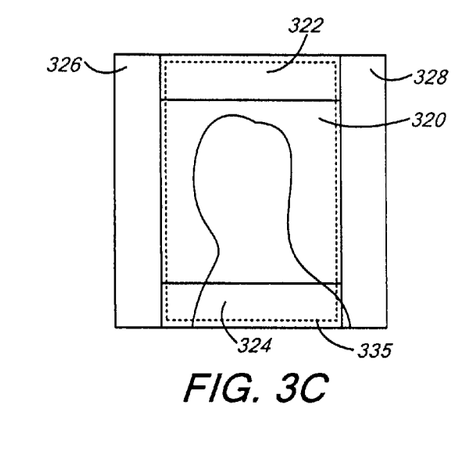
Figure 3D:
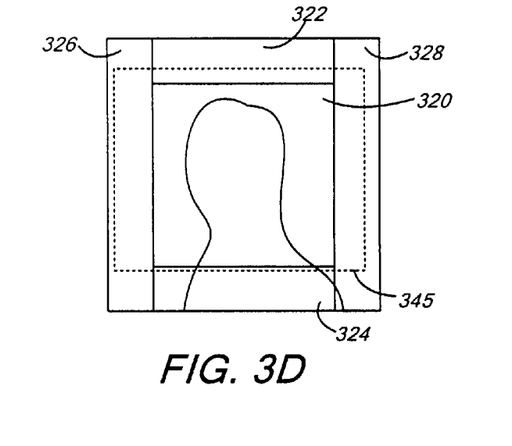

FIGS. 3C and 3D show two examples of later re-cropping of original image 310 using the reserves. FIG. 3C shows a portrait orientation crop 335 with an aspect ratio of 2:3. Crop 335 might be selected to make a 4×6 inch print. In this case, the re-crop only requires the use of the top and bottom reserves 322 and 324. FIG. 3D shows a horizontal crop with an aspect ratio of 5:4 applied to the same original image 310. In this case, all four reserves 322, 324, 326 and 328 are required.

The method of determining the size of the reserves, the method of storing the reserves in the file, and the method of presenting or using them when needed for later re-cropping will now be described in detail.

The JPEG format is the most widely used image file format and is therefore the preferred format for employing the present invention. The detailed description that follows is specific to the JPEG format. It will be clear that an equivalent process could be employed with other standard image file formats. Such alternate embodiments can differ in the details of file construction, but are within the claimed scope of the invention.

Figure 4:
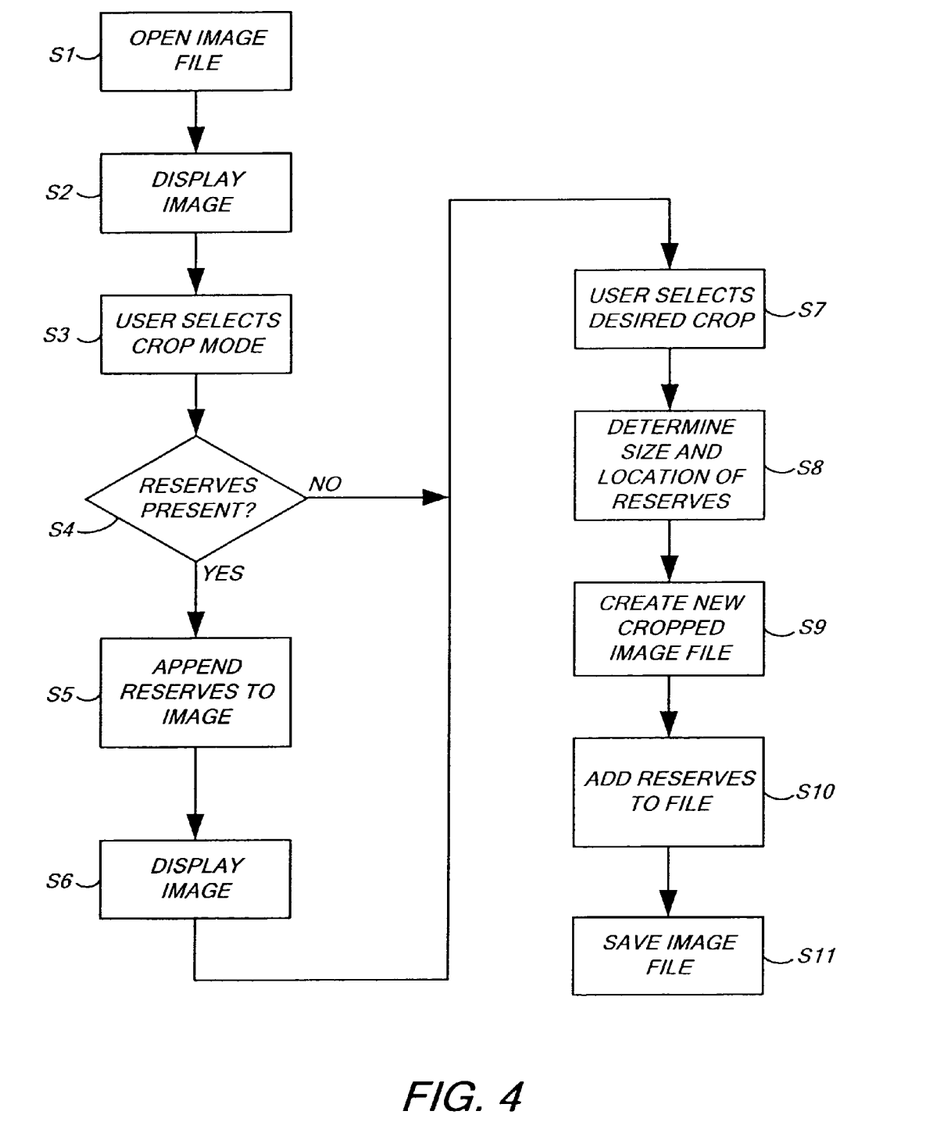
FIG. 4 is a flowchart illustrating the steps of the process of re-cropping an image.

FIG. 4 is a flow chart illustrating the steps of the crop process. In the preferred embodiment, the same process is employed each time the image is cropped. If the image was previously cropped according to the invention, the reserves will be present in the file and will be appended when re-cropping. If the image has not been cropped, the reserves will not be present and will not be appended. Referring to FIG. 4, the image file is opened in step S1. This step includes the familiar operations of selecting the desired image file, locating the file on the storage device using a file directory, reading the file from the storage device into memory, and parsing the image file header. In step S2, the image is displayed for the user. If reserves are present in the image file, the image displayed is the cropped image without the reserves. If no reserves are present, the original image is displayed. In step S3, the user selects the mode of cropping the image. The user can choose a preselected aspect ratio, as when printing to a specified paper size; or they can choose to make a crop selection using the familiar selection box on the displayed image. In decision S4, it is determined whether reserves are present in the file from a previous crop operation. If the process is being performed for the first time on an original image, no reserves will be present and step S7 will be performed next. If reserves are present, they are extracted from the file and appended to the cropped image in step S5. In alternative embodiments, all the reserves are appended, or only the parts of the reserves necessary for the re-crop aspect ratio selected in step S3. The larger image is now displayed for the user in step S6. In step S7, the user selects a new crop using a selection box on the displayed image, or merely confirms the preselected crop, depending on the mode selected in step S3. In step S8, the size and location of the new reserves are determined. The old reserves, if present, are discarded and new reserves determined based on the size of the complete image with old reserves appended, and the new crop area selected. In step S9, the new cropped image file is created. In step S10, the new reserves, determined in step S8 are created and added to the image file. In step S11, the new image file is saved. This step includes the familiar operations of creating a file in the storage device directory, and writing the file from memory to the device.

A method of calculating the size and position of the reserves will now be described. For a particular product embodying the present invention, the designer must determine the maximum aspect ratio to be supported. The method is designed to ensure, if possible, that there is enough image data in the reserves to re-crop the image at the maximum aspect ratio. If the aspect ratio of the original image is less than the maximum aspect ratio, it may not be possible to re-crop at the maximum aspect ratio, depending on the size of the first crop. In this case, the reserves are limited by the edges of the original image. The maximum aspect ratio can be fixed, based on the intended application area or can be a user selectable setting. In the preferred embodiment, the maximum aspect ratio is 1.5 (3:2), since that is the largest ratio in common use for photographic prints. A second design decision is the layout of the reserves. Four options will be described, and other alternatives will be clear.

Figure 5A:
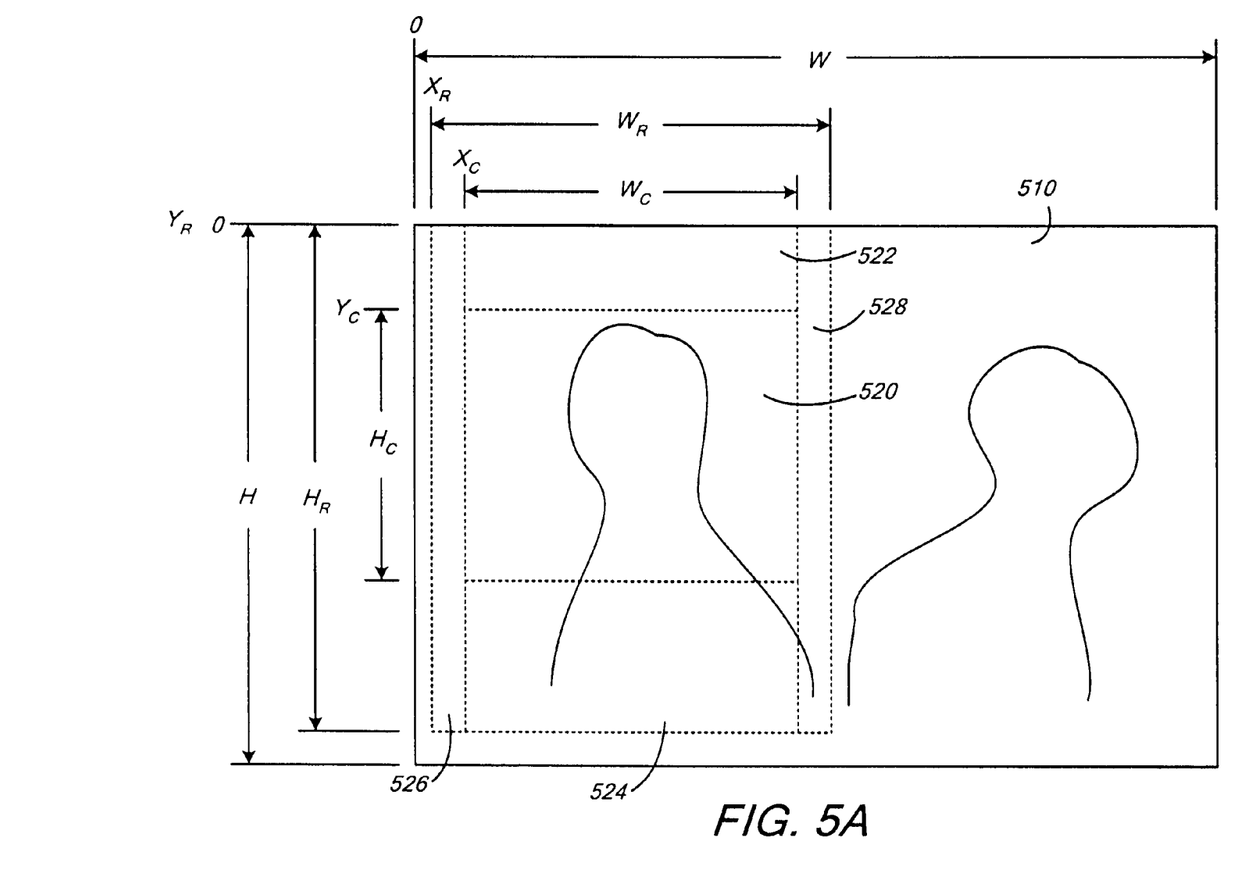
FIG. 5A illustrates and defines the dimensions of the original image and the cropped and reserve images used in the determination of the size and location of the reserves.

FIG. 5A illustrates the preferred layout. This layout was also illustrated in FIG. 3B to 3D. In this case, four reserves are created, if possible. This layout permits re-cropping at the maximum aspect ratio in either horizontal or vertical orientation, regardless of the orientation of the first crop. In the example shown in FIG. 5A, the first crop is horizontal and has an aspect ratio of 1.25 (5:4). The side reserves 526 and 528 (left and right, respectively) permit a horizontal re-crop with a 1.5 aspect ratio. The top and bottom reserves 522 and 524, respectively, permit a vertical re-crop with a 1.5 aspect ratio. Since the side reserves extend vertically beyond the first crop, they provide image data to permit a larger horizontal re-crop as illustrated in FIG. 3D.

Figure 5B:
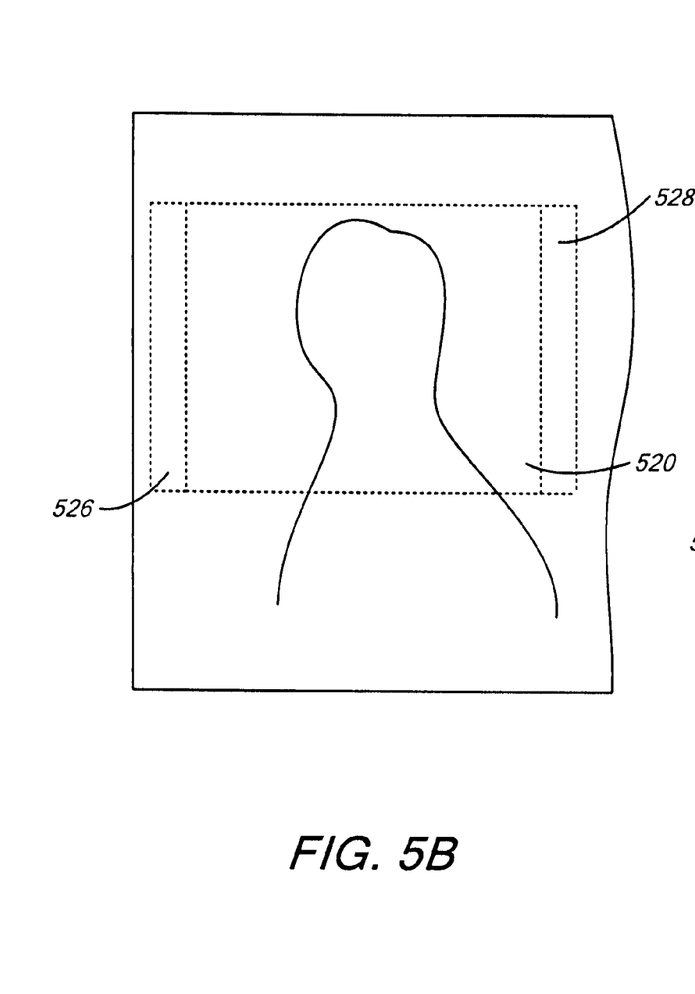
FIGS. 5B, 5C and 5D illustrate three alternative reserve layouts.

FIG. 5B illustrates a second layout. In this case the reserves are only created at the ends of the crop. These reserves permit a re-crop at the maximum aspect ratio, but only with the same orientation as the first crop. If the first crop is vertically oriented, then only top and bottom reserves would be created. This layout is the most limiting of re-cropping, but also provides the smallest image file.

Figure 5C:
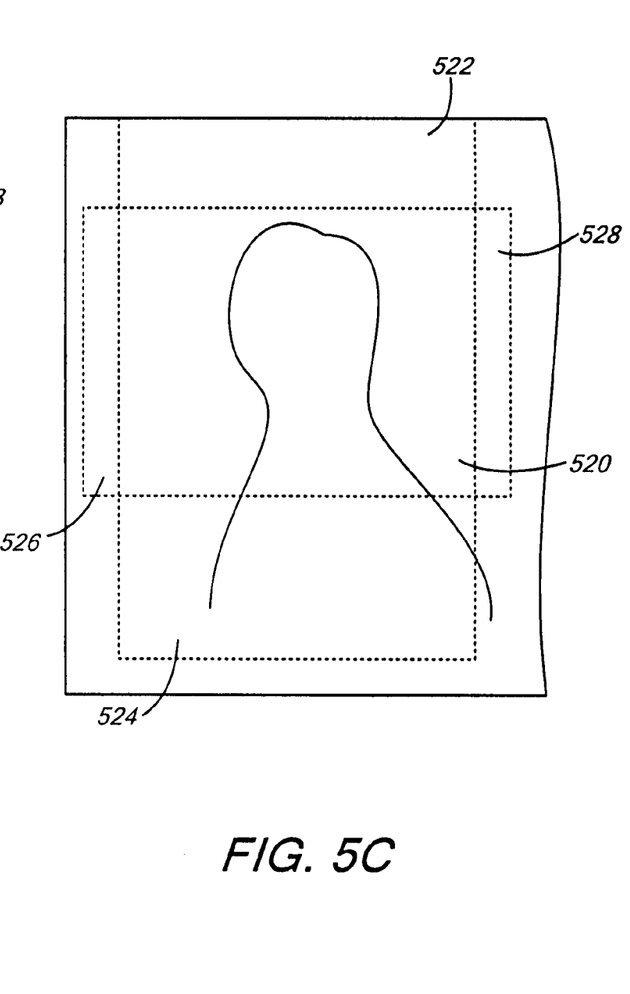

FIG. 5C illustrates another layout that is a modification of that shown in FIG. 5A. In this case, the height of the side reserves is equal to the first crop height. This layout permits re-crops at either orientation, but does not permit a re-crop larger than the first crop in both dimensions.

Figure 5D:
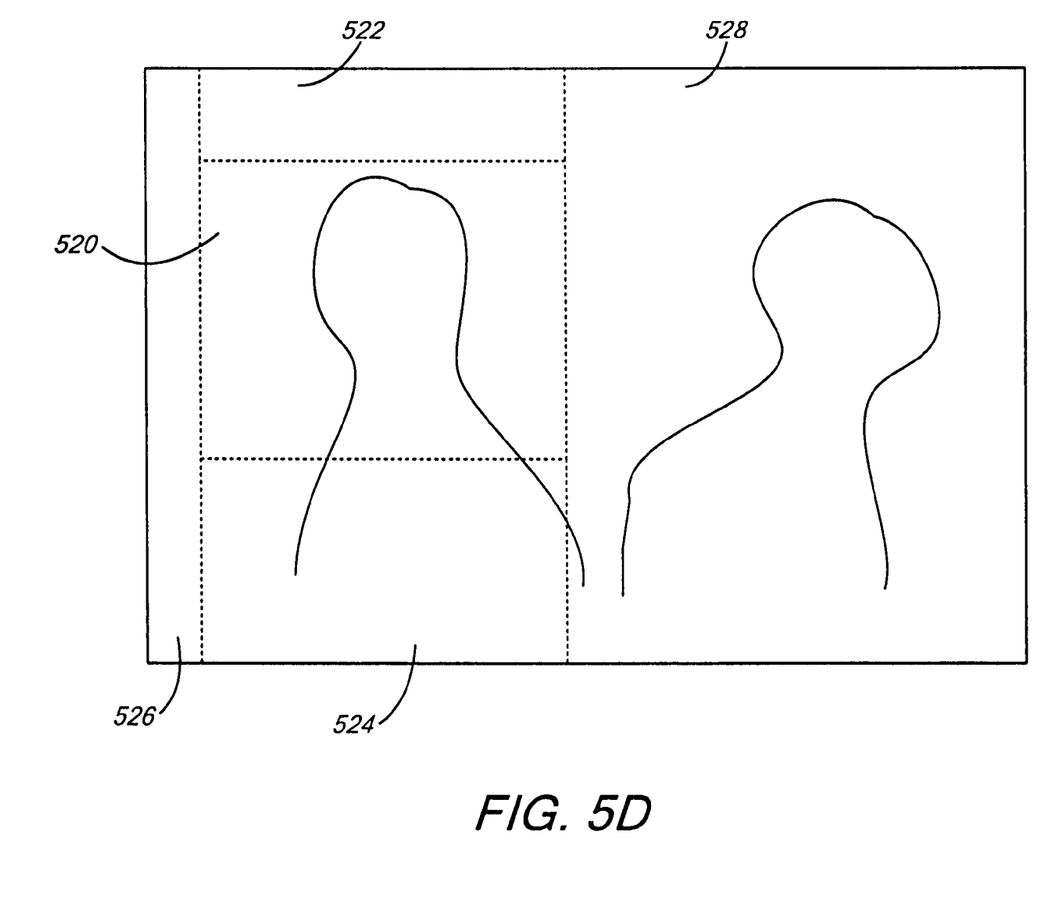

FIG. 5D illustrates a fourth layout. In this case, the reserves include all of the original image not included in the first crop. This layout permits the maximum flexibility in re-cropping, but at the expense of a much larger image file.

The selection of the reserve layout should be based on the specific application of the invention and involves a tradeoff between file size and later re-cropping flexibility.

Referring again to FIG. 5A, the calculation of the dimensions of the reserves will now be described. FIG. 5A illustrates the following important dimensions:

H=Height of original image
W=Width of original image
$X_C$=Horizontal position of crop
$Y_C$=Vertical position of crop
$W_C$=Width of crop
$H_C$=Height of crop
$X_C$=Horizontal position of reserves
$Y_C$=Vertical position of reserves
$W_R$=Width of reserves
$H_R$=Height of reserves In FIG. 5A, as is common in image manipulation in general, the origin of the coordinate system is the upper left corner of the image. The following equations are used to calculate the location and size of the reserves, where $A_{MAX}$=maximum aspect ratio.

$$W_R = H_C * A_{MAX}$$

If $W_R > W$ Then $W_R = W$ $$H_R = W_C * A_{MAX}$$

If $H_R > H$ Then $H_R = H$ $$X_R = X_C - ((W_R - W_C)/2)$$

If $X_R < 0$ Then $X_R = 0$ Else If $X_R + W_R > W$ Then $X_R = W - W_R$ $$Y_R = Y_C - ((H_R - H_C)/2)$$

If $Y_R < 0$ Then $Y_R = 0$ Else If $Y_R + H_R > H$ Then $Y_R = H - H_R$

The results of these calculations are then used to calculate the size and position of each of the two or four reserves required, based on the reserve layout choice described previously. If a reserve has a width or height of zero, then no data is saved for that reserve. This will be the case if the first crop extends to any edge of the original image.

For the layout of FIG. 5A, the position and dimensions of the reserves are:

| | X | Y | Width | Height |
|---|---|---|---|---|
| Top (522): | $X_C$ | $Y_R$ | $W_C$ | $Y_C - Y_R$ |
| Bottom (524) | $X_C$ | $Y_C + H_C$ | $W_C$ | $(Y_R + H_R) - (Y_C + H_C)$ |
| Left (526) | $Y_R$ | $Y_C$ | $X_C - W_R$ | $H_R$ |
| Right (528) | $X_C + W_C$ | $Y_C$ | $(X_R + W_R) - (X_C + W_C)$ | $H_R$ |

For the layout of FIG. 5B, the position and dimensions of the reserves are:

| | X | Y | Width | Height |
|---|---|---|---|---|
| Left (526) | $X_R$ | $Y_C$ | $X_C - X_R$ | $H_C$ |
| Right (528) | $X_C + W_C$ | $Y_C$ | $(X_R + W_R) - (X_C + W_C)$ | $H_C$ |

For the layout of FIG. 5C, the position and dimensions of the reserves are:

| | X | Y | Width | Height |
|---|---|---|---|---|
| Top (522) | $X_C$ | $Y_R$ | $W_C$ | $Y_C - Y_R$ |
| Bottom (524) | $X_C$ | $Y_C + H_C$ | $W_C$ | $(Y_R + H_R) - (Y_C + H_C)$ |
| Left (526) | $X_R$ | $Y_C$ | $X_C - X_R$ | $H_C$ |
| Right (528) | $X_C + W_C$ | $Y_C$ | $(X_R + W_R) - (X_C + W_C)$ | HC |

For the layout of FIG. 5D, the position and dimensions of the reserves are:

|              | X       | Y       | Width       | Height        |
|--------------|---------|---------|-------------|---------------|
| Top (522)    | XC      | 0       | WC          | YC            |
| Bottom (524) | XC      | YC + HC | WC          | H − (YC + HC) |
| Left (526)   | 0       | 0       | XC          | H             |
| Right (528)  | XC + WC | 0       | W − (XC + WC) | H           |

Figure 6:
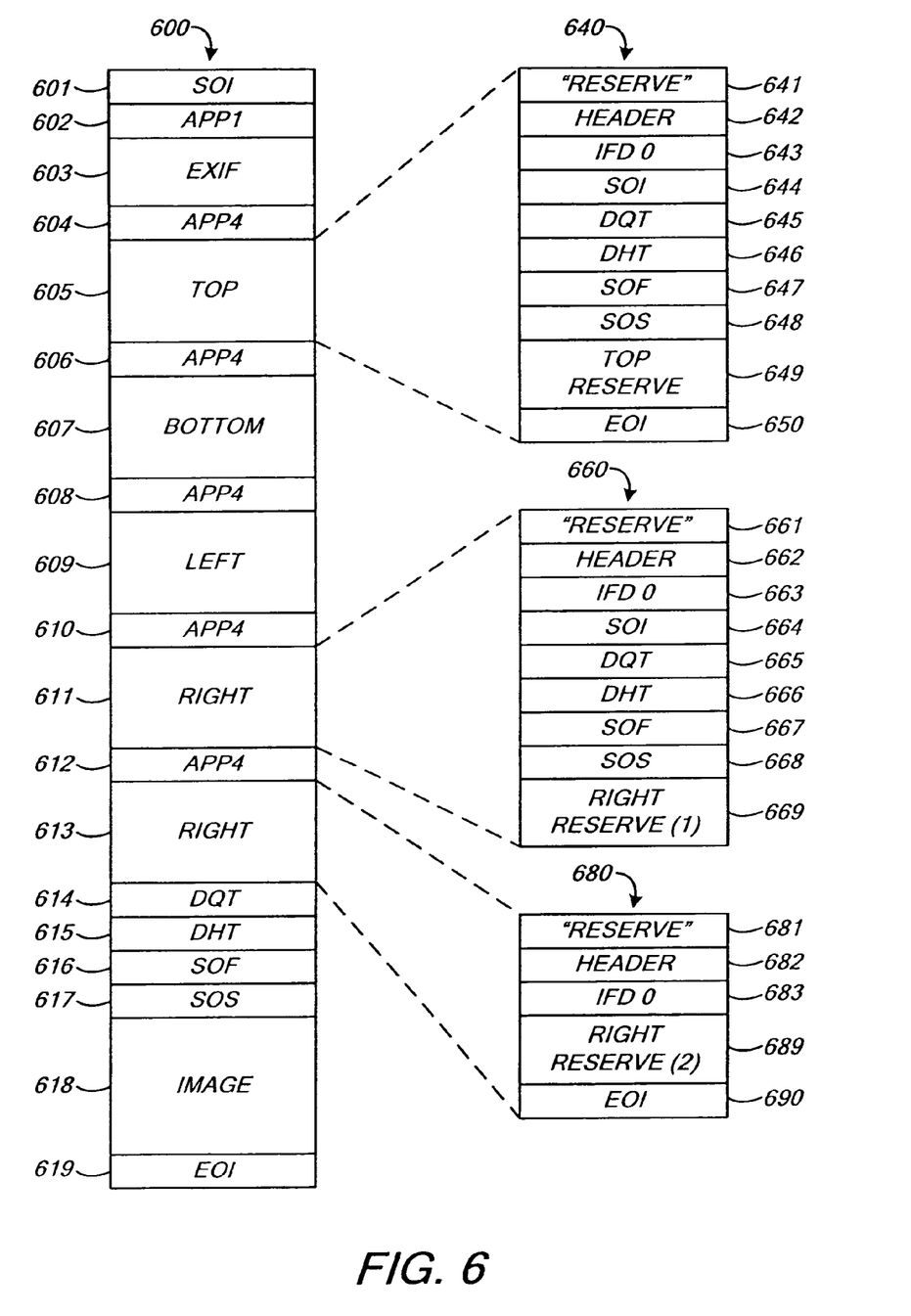
FIG. 6 shows the format of a JPEG image file containing reserves according to the invention.

FIG. 6 shows the format of a JPEG image file with reserves included in the preferred manner. The well known JPEG file structure is fully described in the so-called JPEG standard, which is available from the International Standards Organization (ISO), Geneva, Switzerland, as ISO/IEC 10918-1: 1994 "Information technology—Digital compression and coding of continuous-tone still images: Requirements and guidelines" and will be briefly described here for completeness. An image file 600 includes a series of marker segments. The file shown is an example. The JPEG standard permits many combinations of marker segments and the illustrated example in no way limits the scope of this description. The example illustrates the preferred method of including the reserve data in the image file. The start of image (SOI) marker 601 marks the beginning of the file. An application segment 1 (APP 1) marker 602 marks the beginning of an EXIF application segment 603. Next are four application segments containing the reserves. The structure of these segments will be described in detail later. Application segment 4 (APP4) marker 604 marks the beginning of a segment 605 containing the top reserve. Markers 606 and 608 mark the beginning of segments 607 and 609, containing the bottom and left reserves, respectively. In the example of FIG. 6, the right reserve is too large to fit in a single segment, so it is contained in two segments 611 and 613, marked by markers 610 and 612. Following the reserve segments, the next segments contain the cropped main image in the standard JPEG structure. Define quantization table (DQT) marker 614, define huffman table (DHT) marker 615, start of frame (SOF) marker 616, start of scan (SOS) marker 617, image data 618, and end of image (EOI) marker 619 are well known and are used in the conventional manner.

The method of storing the reserves in application segments will now be described. Any application segment in a JPEG file is limited to a maximum size of 65536 bytes. The total size of the reserves and of individual reserves will often be much larger than this, so a method is described which can store large images in multiple application segments. According to the present invention, from one to four reserves are stored in the image file in addition to the cropped main image. Since each reserve is really an image, the reserves are stored using the standard JPEG file structure, just as is the main image. This approach is convenient as the same software functions can be used to compress and decompress the reserves as well as the main image.

As defined in the JPEG standard, an application segment can be used for any purpose. In the preferred embodiment, application marker 4 is used for the reserve data. Since the number of available application markers is quite limited, it is common to further identify an application segment with string label following the application data segment length field. The word "RESERVE" is used to identify application segments containing crop reserves. Referring again to FIG. 6, image file 600 contains five reserve segments. The application segment 4 marker 604 includes the application data segment length field as defined in the JPEG standard. The content of the top reserve segment 605 is expanded as top reserve segment 640. An identifier string 641 indicates that this is a reserve segment to distinguish it from any other application 4 segments that might be present. Following the identifier string 641, a header 642 and an image file directory (IFD) structure 643 conforming to the Tagged Image File Format (TIFF) standard is used to fully identify and define the segment. Following the IFD 643, the top reserve image is stored as a complete JPEG interchange format file including a start of image (SOI) marker 644, define quantization table (DQT) marker 645, define huffman table (DHT) marker 646, start of frame (SOF) marker 647, start of scan (SOS) marker 648, top reserve image data 649, and end of image (EOI) marker 650.

In the example shown, the right reserve is too large to fit in a single application segment. In this case, the image is still formatted as a single JPEG interchange format file, but the file is divided among two or more application segments. In FIG. 6, this image is stored in two segments 611 and 613, identified by application markers 610 and 612. The contents of these two segments are expanded as segments 660 and 680. Segment 660 is similar to segment 640, except that it does not contain the entire JPEG bitstream of the right reserve. The segment 660 is identified by a "RESERVE" string 661, header 662 and IFD 663. Following the IFD 663 is the first portion of the JPEG interchange format image file, including start of image (SOI) marker 664, define quantization table (DQT) marker 665, define huffman table (DHT) marker 666, start of frame (SOF) marker 667, start of scan (SOS) marker 668, and the first portion of the right reserve image data 669. The remainder of the right reserve image is contained in segment 680. This segment 680 is similarly identified by "RESERVE" string 681, header 682 and IFD 683. Following the IFD 683 is the remainder of the right reserve image data 689 and the end of image (EOI) marker 690.

Since each APP4 segment is identified only as a reserve segment by identifier strings 641, 661 and 681, the segments must be further identified by IFDs 643, 663 and 683.

| Header              | Byte order 0x4D4D ("MM")            |
|---------------------|-------------------------------------|
| TIFF identifier     | 0x002A                              |
| Offset to first IFD | 0x00000008                          |
| IFD0                | Number of directory entries 0x0006  |
| Xposition           | SLONG                               |
| Yposition           | SLONG                               |
| ImageWidth          | LONG                                |
| ImageHeight         | LONG                                |
| Offset              | LONG                                |
| StripOffsets        | UNDEFINED                           |

Xposition is the horizontal position of the left edge of the reserve image relative to the left edge of the cropped main image, counted in pixels. Yposition is the vertical position of the top edge of the reserve image relative to the top edge of the cropped main image. Xposition and Yposition can be positive or negative depending on the location of the reserve. For example, the top reserve 522 shown in FIG. 5A has an Xposition of zero because the left edge of the reserve and the left edge of the main image are colinear. It will have a negative Yposition because the top edge of the reserve is above the top edge of the main image.

ImageWidth and ImageHeight describe the size of the reserve image in the conventional way. The combination of Xposition, Yposition, ImageWidth and ImageHeight fully describe the size and location of the reserve image, permitting the reserve to be appended to the main image correctly for re-cropping.

Offset is the position within the JPEG bitstream of the portion of the reserve contained in a segment. This is the byte count from the beginning of the JPEG interchange format file (the start of image marker) to the beginning of the particular portion of the JPEG file in a particular segment. The first application segment for a given reserve will contain an offset of zero, since that segment begins with the start of image marker.

StripOffsets is the offset from the beginning of the header to the beginning of the JPEG data in the segment.

Using the TIFF structure permits additional information to be added to the reserve segments without causing compatibility problems with older software. The tags listed above are the preferred minimum set to permit efficient utilization of the reserve images.

The invention has been described in detail with particular reference to certain preferred embodiments thereof, but it will be understood that variations and modifications can be effected within the spirit and scope of the invention.

PARTS LIST

| | |
|---|---|
| 110 | original image |
| 112 | unwanted subject matter |
| 115 | cropped image area |
| 120 | cropped image |
| 132, 134 | cut off portions |
| 135 | crop area |
| 142, 144 | blank spaces |
| 145 | crop area |
| 210 | original image |
| 212 | unwanted subject |
| 215 | user selected crop rectangle |
| 220 | cropped image |
| 222 | top reserve |
| 224 | bottom reserve |
| 235 | second crop area |
| 310 | original image |
| 315 | square crop |
| 320 | cropped image |
| 322 | top reserve |
| 324 | bottom reserve |
| 326 | left reserve |
| 328 | right reserve |
| 335 | portrait crop |
| 345 | horizontal crop |
| 510 | original image |
| 520 | cropped image |
| 522 | top reserve |
| 524 | bottom reserve |
| 526 | left reserve |
| 528 | right reserve |
| 600 | image file |
| 601 | start of image marker |
| 602 | application segment 1 marker |
| 603 | EXIF application segment |
| 604 | application segment 4 marker |
| 605 | top reserve segment |
| 606 | application segment 4 marker |
| 607 | bottom reserve segment |
| 608 | application segment 4 marker |
| 609 | left reserve segment |
| 610 | application segment 4 marker |
| 611 | right reserve segment |
| 612 | application segment 4 marker |
| 613 | right reserve segment |
| 614 | define quantization table marker |
| 615 | define huffman table marker |
| 616 | start of frame marker |
| 617 | start of scan marker |
| 618 | image data |
| 619 | end of image marker |
| 640 | top reserve segment |
| 641 | identifier string |
| 642 | header |
| 643 | image file directory |
| 644 | start of image marker |
| 645 | define quantization table marker |
| 646 | define huffman table marker |
| 647 | start of frame marker |
| 648 | start of scan marker |
| 649 | top reserve image data |
| 650 | end of image marker |
| 660 | first right reserve segment |
| 661 | identifier string |
| 662 | header |
| 663 | image file directory |
| 664 | start of image marker |
| 665 | define quantization table marker |
| 666 | define huffman table marker |
| 667 | start of frame marker |
| 668 | start of scan marker |
| 669 | right reserve image data |
| 680 | second right reserve segment |
| 681 | identifier string |
| 682 | header |
| 683 | image file directory |
| 689 | right reserve image data |
| 690 | end of image marker |
| S1 | open image file step |
| S2 | display image step |
| S3 | select crop mode step |
| S4 | reserves present decision |
| S5 | append reserves to image step |
| S6 | display image step |
| S7 | select desired crop step |
| S8 | determine size and location of reserves step |
| S9 | create new cropped image file step |
| S10 | add reserves to file step |
| S11 | save image file step |

The invention claimed is:

1. A method of using a device capable of cropping a digital image stored in an image file in a storage device for producing a cropped digital image, the method comprising:
   (a) cropping the digital image to produce a first cropped digital image, the first cropped digital image having a first size and a first aspect ratio;
   (b) determining, based on the location of the cropping, at least one reserve portion of the image adjacent to at least one edge of the first cropped digital image;
   (c) storing, in the image file in the storage device, the first cropped digital image and the reserve(s);
   (d) retrieving the first cropped digital image from the image file in the storage device; and
   (e) appending at least a portion of at least one reserve to the cropped digital image to produce a second cropped digital image, the second cropped digital image having a second aspect ratio different than the first aspect ratio.

2. The method of claim 1 wherein the digital image is cropped in accordance with a preselected aspect ratio.

3. The method of claim 1 wherein the digital image is cropped in accordance with a user selected aspect ratio.

4. The method of claim 1 wherein the first cropped digital image is stored as a JPEG compressed main image.

5. The method of claim 4 wherein the reserve(s) are stored in at least one application segment.

6. The method of claim 1 wherein the cropping is rectangular and reserve portions correspond to different edges of the cropped digital image.

7. A digital image file produced by the method of claim 1.

8. A method of using a device capable of cropping a digital image stored in an image file in a storage device for producing a cropped digital, the method comprising:

(a) cropping the digital image to produce a first cropped digital image, the first cropped digital image having a first size and a first aspect ratio;

(b) determining, based on the location of the cropping, at least one reserve portion of the image adjacent to at least one edge of the first cropped digital image;

(c) storing, in the image file in the storage device, the first cropped digital image and the reserve(s);

(d) retrieving the cropped digital image from the image file in the storage device; and (e) appending at least a portion of at least one reserve to the cropped digital image to produce the second cropped digital image, the second cropped digital image having a second size different than the first size.

9. The method of claim 8 wherein the digital image is cropped in accordance with a preselected aspect ratio.

10. The method of claim 8 wherein the digital image is cropped in accordance with a user selected aspect ratio.

11. The method of claim 8 wherein the first cropped digital image is stored as a JPEG compressed main image.

12. The method of claim 11 wherein the reserve(s) are stored in at least one application segment.

13. The method of claim 8 wherein the cropping is rectangular and reserve portions correspond to different edges of the cropped digital image.

14. A digital image file produced by the method of claim 8.

15. A method of using a device capable of cropping a digital image stored in an image file in a storage device for cropping a digital image and preserving a reserve for subsequent use, the method comprising:

(a) cropping the digital image to produce a first cropped digital image, the first cropped digital image having a first size and a first aspect ratio;

(b) determining, based on the location of the cropping, at least one reserve portion of the image adjacent to at least one edge of the first cropped digital image; and (c) storing, in the image file on the storage device, the first cropped digital image and the reserve(s), wherein the edge is a vertical edge, and wherein the width of the reserve portion of the image adjacent to the vertical edge is calculated by multiplying the height of the first cropped digital image by a maximum aspect ratio value and subtracting the width of the first cropped digital image.

16. The method of claim 15 wherein the digital image is cropped in accordance with a preselected aspect ratio.

17. The method of claim 15 wherein the digital image is cropped in accordance with a user selected aspect ratio.

18. The method of claim 15 wherein the first cropped digital image is stored as a JPEG compressed main image.

19. The method of claim 18 wherein the reserve(s) are stored in at least one application segment.

20. The method of claim 15 wherein the cropping is rectangular and reserve portions correspond to different edges of the cropped digital image.

21. A digital image file produced by the method of claim 15.

22. A digital storage device for storing a digital image file, the digital image file associated with a stored, digitally cropped version of an original digital image, wherein the digital image file comprises:

(a) a cropped digital image; and (b) at least one reserve portion of the original digital image, the reserve portion comprising a portion of the original digital image adjacent to the cropped digital image, wherein the width of at least one reserve portion of the original digital image adjacent to a vertical edge of the cropped digital image is equal to the height of the cropped digital image times a maximum aspect ratio value minus the width of the cropped digital image.

23. The storage device of claim 22 wherein the cropped digital image is stored as a JPEG compressed main image.

24. The storage device of claim 23 wherein the reserve(s) are stored in at least one application segment.

\* \* \* \* \*